United States Patent
Langenfeld

(10) Patent No.: US 8,001,883 B1
(45) Date of Patent: Aug. 23, 2011

(54) RETURN TO NEUTRAL DEVICE FOR A HYDRAULIC APPARATUS

(75) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 617 days.

(21) Appl. No.: 12/056,439

(22) Filed: Mar. 27, 2008

Related U.S. Application Data

(60) Provisional application No. 60/909,625, filed on Apr. 2, 2007.

(51) Int. Cl.
*F01B 3/02* (2006.01)

(52) U.S. Cl. ........................................... 92/12.2

(58) Field of Classification Search ............ 92/12.2
See application file for complete search history.

(56) References Cited

U.S. PATENT DOCUMENTS

| | | |
|---|---|---|
| 2,474,706 A | 6/1949 | Wahlmark |
| 3,279,172 A | 10/1966 | Kudo et al. |
| 3,362,161 A | 1/1968 | Flint |
| 3,727,712 A | 4/1973 | Colloton |
| 4,116,292 A | 9/1978 | Todeschini et al. |
| 4,174,013 A | 11/1979 | Yago |
| 4,283,962 A | 8/1981 | Forster |
| 4,461,341 A | 7/1984 | Morrison |
| 4,584,926 A | 4/1986 | Beck et al. |
| 4,845,949 A | 7/1989 | Shivvers et al. |
| 4,955,249 A | 9/1990 | Wetor |
| 5,044,478 A | 9/1991 | Kaesgen |
| 5,078,222 A | 1/1992 | Hauser et al. |
| 5,207,144 A | 5/1993 | Sporrer et al. |
| 5,241,872 A | 9/1993 | Betz et al. |
| 5,259,194 A | 11/1993 | Okada |
| 5,314,387 A | 5/1994 | Hauser et al. |
| 5,528,958 A | 6/1996 | Hauser |
| 5,622,051 A | 4/1997 | Iida et al. |
| 5,836,159 A | 11/1998 | Shimizu et al. |
| 5,918,691 A | 7/1999 | Ishii |
| 5,957,229 A | 9/1999 | Ishii |
| RE36,807 E | 8/2000 | Okada |
| 6,122,996 A | 9/2000 | Hauser et al. |
| 6,253,637 B1 | 7/2001 | Hauser et al. |
| 6,425,244 B1 | 7/2002 | Ohahi et al. |
| 6,487,857 B1 | 12/2002 | Poplawski et al. |
| 6,672,058 B1 | 1/2004 | Langenfeld et al. |
| 6,701,825 B1 | 3/2004 | Langenfeld |
| 6,766,715 B1 | 7/2004 | Wiley et al. |
| 6,782,797 B1 | 8/2004 | Brandenburg et al. |

(Continued)

FOREIGN PATENT DOCUMENTS

JP 08-219253 8/1996

(Continued)

*Primary Examiner* — F. Daniel Lopez
(74) *Attorney, Agent, or Firm* — Neal, Gerber & Eisenberg LLP

(57) ABSTRACT

In a hydrostatic device using an axial piston pump, a yoke is mounted so that it contacts the movable swash plate of the hydrostatic transmission. The yoke is biased by a spring-type mechanism to force the swash plate to return to neutral, and the set position of the yoke plate may be externally adjusted. A bias or load arm rotatably fixed to a housing at one end and connected to a spring at the other end is engaged to the yoke to provide the return force to the yoke plate. The yoke plate may have two legs to provide a return to neutral force to the swash plate in either direction, or one leg to provide the return to neutral force in only a single direction.

25 Claims, 15 Drawing Sheets

U.S. PATENT DOCUMENTS

| | | |
|---|---|---|
| 6,829,979 B1 | 12/2004 | Thomas |
| 6,843,056 B1 | 1/2005 | Langenfeld et al. |
| 6,880,333 B1 | 4/2005 | Taylor et al. |
| 6,923,092 B1 | 8/2005 | Wiley et al. |
| 6,964,164 B1 | 11/2005 | Langenfeld |
| 7,111,545 B1 | 9/2006 | Langenfeld |
| 7,234,385 B2 | 6/2007 | Dong et al. |

FOREIGN PATENT DOCUMENTS

| | | |
|---|---|---|
| JP | 2000-009023 | 1/2000 |
| JP | 2000-71790 | 3/2000 |

RETURN TO NEUTRAL DEVICE FOR A HYDRAULIC APPARATUS

CROSS REFERENCE TO RELATED APPLICATIONS

This application claims the priority of U.S. Provisional Patent Application Ser. No. 60/909,625 filed on Apr. 2, 2007. This prior application is incorporated herein by reference in its entirety.

BACKGROUND OF THE INVENTION

This invention relates to an improved design of a return to neutral mechanism for use in a variable displacement hydraulic unit such as a pump, a hydrostatic transmission ("HST") or an integrated hydrostatic transmission ("IHT") incorporating output gearing and axles, and such devices can be used in a wide variety of uses, including vehicles and industrial applications. The operation of a hydrostatic application such as a pump, HST or IHT is generally known in the art and will not be described in detail herein. For example, the arrangement of an IHT and the operation of the components thereof are generally described in U.S. Pat. Nos. 5,314,387 and 6,122,996, the terms of which are incorporated herein by reference.

In general, an HST has a hydraulic pump and a hydraulic motor mounted in a housing. The pump and motor are hydraulically linked through a generally closed circuit, and both consist of a rotatable body with pistons mounted therein. Hydraulic fluid such as oil is maintained in the closed circuit, and the HST generally has a sump or reservoir with which the closed circuit can exchange oil. This sump may be formed by the housing itself.

In a typical arrangement, the pump is usually driven by an external motive source such as pulleys or belts connected to an internal combustion engine. The axial pistons of the pump engage a moveable swash plate and, as the pump is rotated by an input source driven by the external engine, the pistons engage the swash plate. Movement of the pump pistons creates movement of the hydraulic fluid from the pump to the motor to drive the motor cylinder block and the motor output shaft. This output shaft may be linked to mechanical gearing and output axles, which may be internal to the HST housing, as in an IHT, or external thereto. The swash plate is generally controlled by a control arm which is connected via linkage to either a hand control or foot pedal mechanism to control direction and speed.

The pump system is fully reversible in a standard HST. As the pump swash plate is moved, the rotational direction of the motor can be changed. The HST closed circuit has two sides, namely a high pressure side in which oil is being pumped from the pump to the motor, and a low pressure or vacuum side, in which oil is being returned from the motor to the pump. When the swash plate angle is reversed, the flow out of the pump reverses so that the high pressure side of the circuit becomes the vacuum side and vice versa. This hydraulic circuit can be formed as porting formed within the HST housing, or internal to a center section on which the pump and motor are rotatably mounted, or in other ways known in the art. Check valves are often used to draw hydraulic fluid into the low pressure side to make up for fluid lost due to leakage, for example.

A hydraulic pump will also have a "neutral" position where the pump pistons are not moved in an axial direction, so that rotation of the pump cylinder block does not create any movement of the hydraulic fluid. The swash plate is in neutral when it is generally perpendicular with respect to the pump pistons.

For safety reasons, and for the convenience of the user, it is preferred to have a return to neutral, or zero displacement, feature which forces the swash plate to its neutral position when no force is being applied to the control arm. Such a feature eliminates unintended movement of the vehicle, and returns the unit to neutral in the event of an accident where the vehicle operator is unable to physically disengage the transmission.

SUMMARY OF THE INVENTION

The invention provides an improved return design for a swash plate used with a variable displacement hydraulic pump, and in particular a simplified internal return to neutral design that uses fewer parts and is easier to install than known designs. This return to neutral design may either be bi-directional, returning the unit to neutral when stroked in either the forward or reverse direction, or uni-directional, providing a return force in only one direction and not the other. The invention is described herein in connection with a hydrostatic transaxle but it could be used in a device having only a pump without the separate hydraulic motor, or with the motor in a separate housing.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE INVENTION

Figure 1:
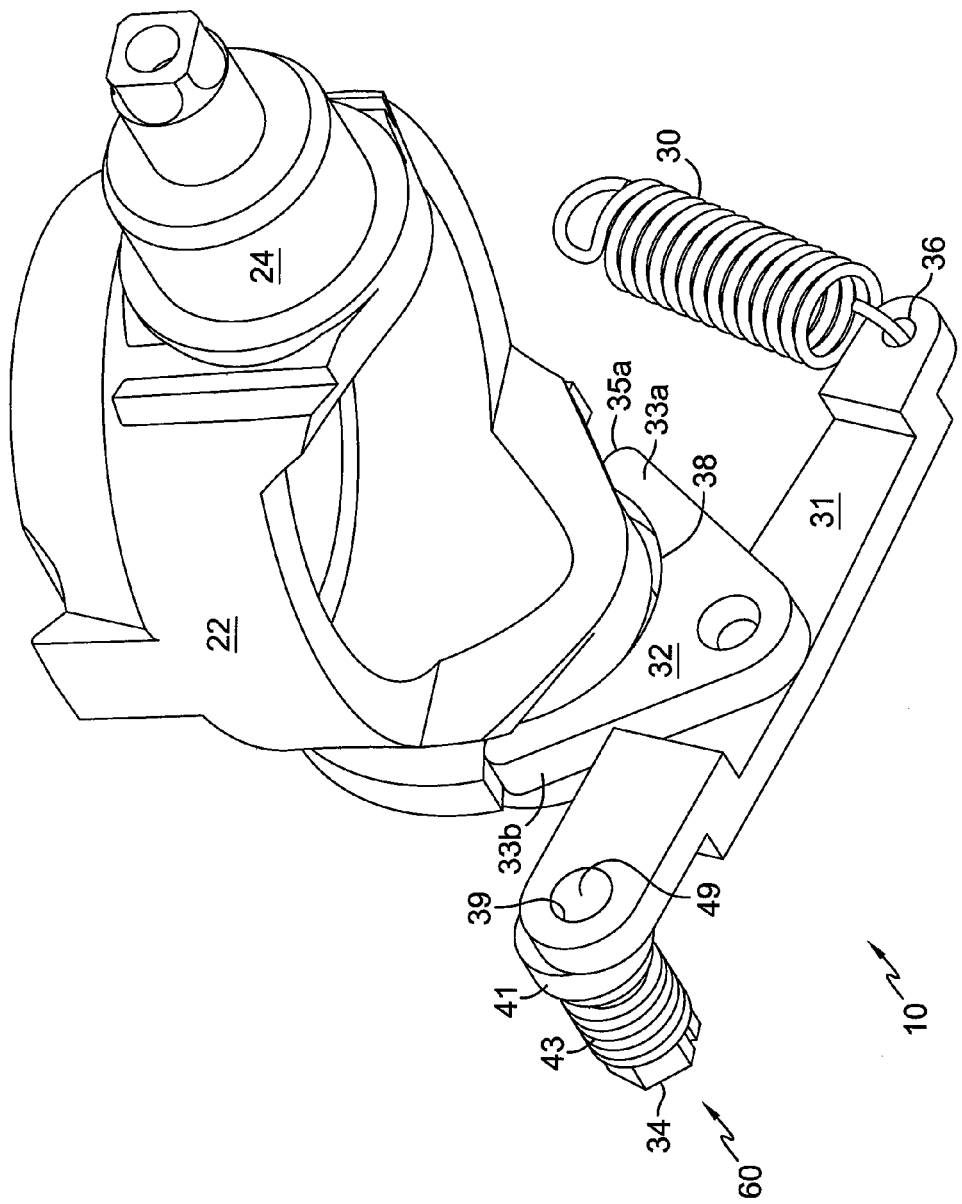
FIG. 1 is a perspective view of the return to neutral feature of one embodiment of the present invention and an exemplary swash plate, showing the relationship of the two when the swash plate is in a stroked position.
Figure 2:
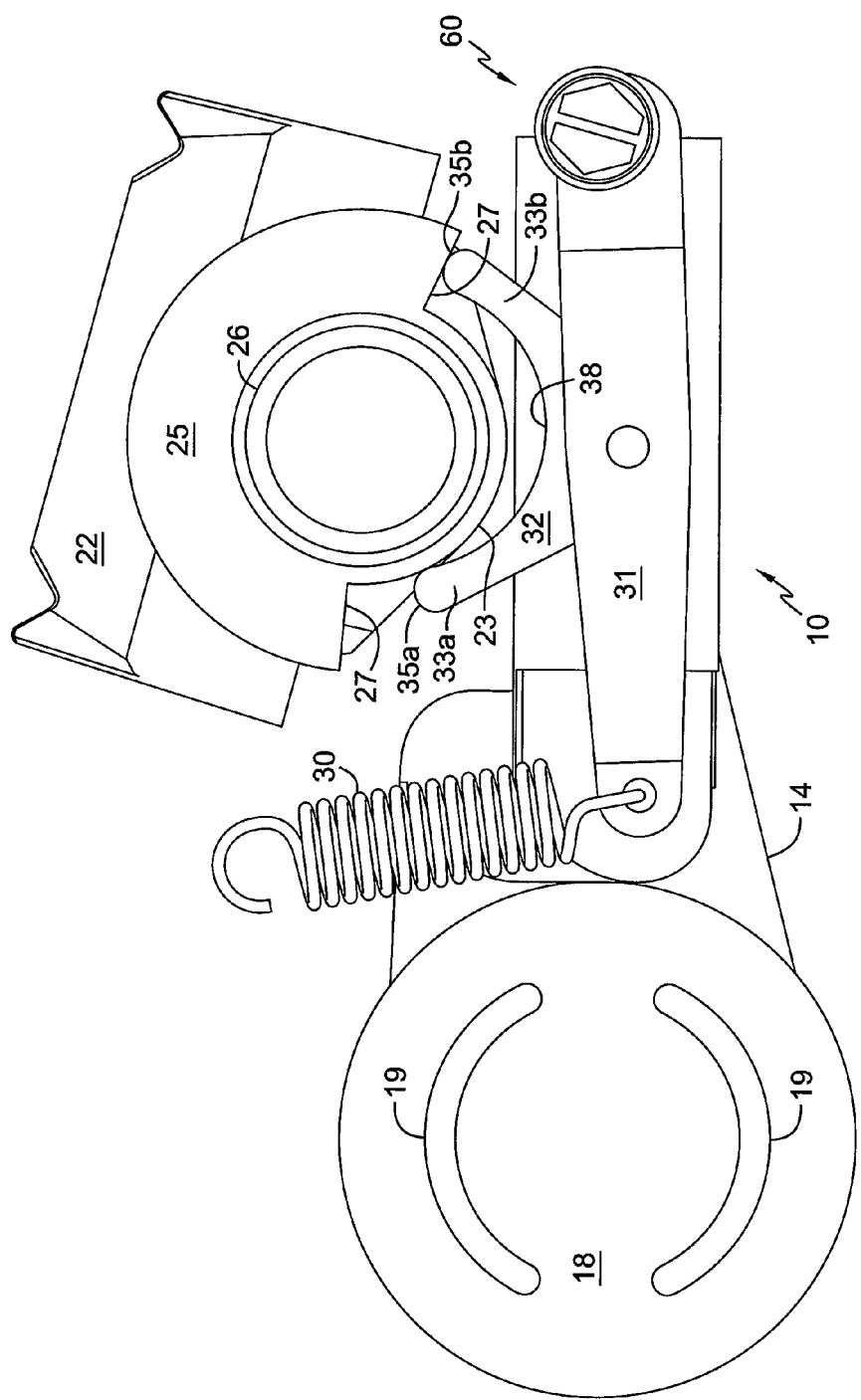
FIG. 2 is an end view of the return to neutral feature and swash plate as shown in FIG. 1, in conjunction with an exemplary center section, with the swash plate in the stroked position.
Figure 3:
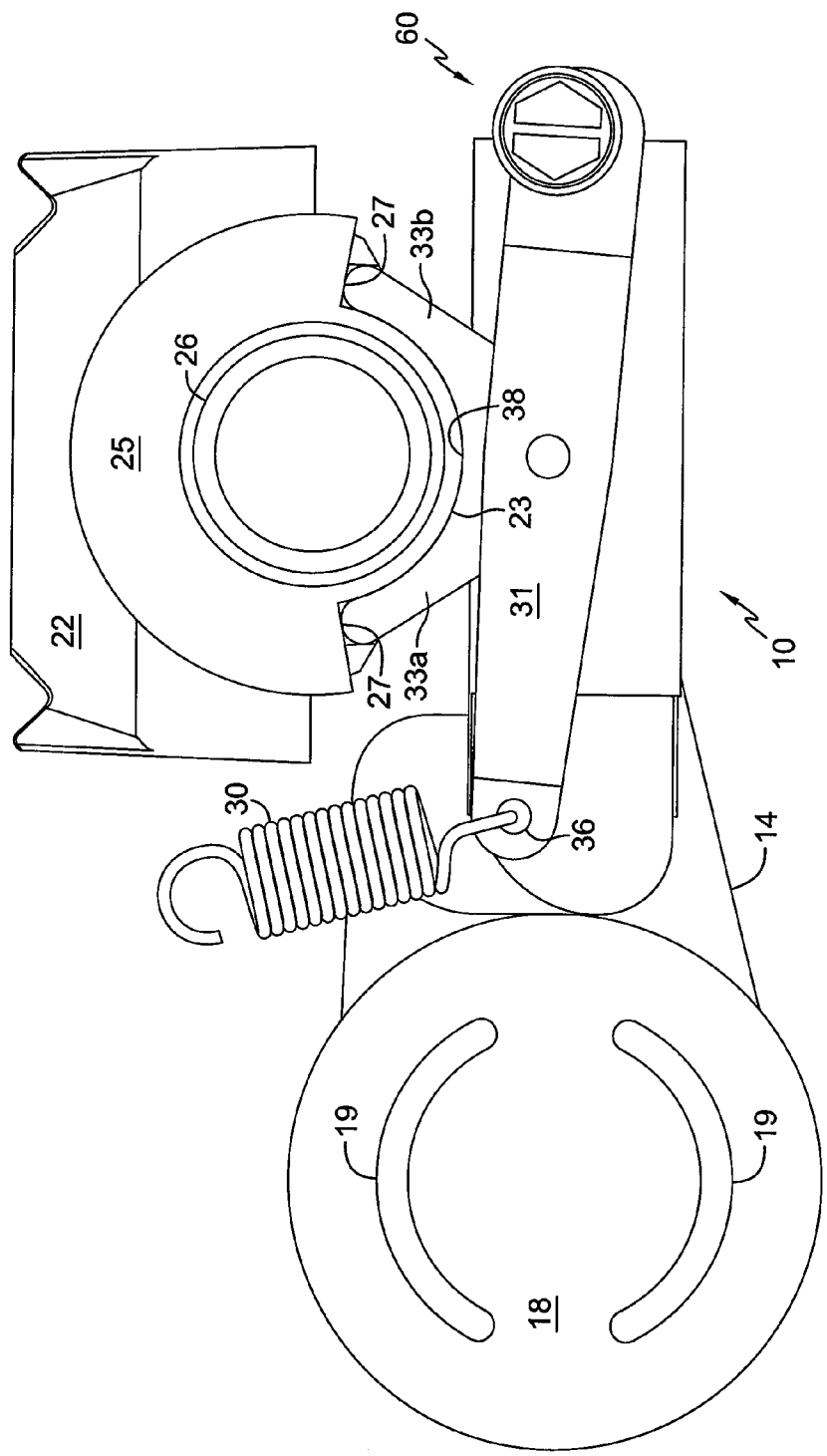
FIG. 3 is a view similar to that of FIG. 2, with the swash plate in the neutral position.

A first embodiment of this invention and in particular return to neutral mechanism 10 is disclosed in FIGS. 1-3. A second embodiment of the invention and in particular return to neutral mechanism 110 is disclosed in FIGS. 4-12. A third embodiment of the invention and in particular return to neutral mechanism 210 is disclosed in FIGS. 13-15.

The general arrangement of the hydrostatic transmission used with these embodiments will be discussed with regard to hydrostatic transmission 120 shown in FIG. 4. Pump cylinder block 12 is rotatably mounted on center section 114, which includes internal hydraulic porting (not shown) to transfer hydraulic fluid between pump cylinder block 12 and motor cylinder block 15. A plurality of pump pistons (not shown) are mounted in cylinder block 12. Center section 114 and the other components could take on a variety of other shapes and arrangements. By way of example only, the pump and motor cylinder blocks need not be at right angles to one another but could also be in a parallel or back-to-back arrangement, and center section 114 could be formed in the shape of a plate or other structure, or could be formed as part of the housing.

Center section 14 is depicted in FIGS. 2 and 3 in connection with the first embodiment of this invention and while it is a different shape than center section 114, both can operate in essentially the same manner. In both cases, a motor running surface 18 is provided with a pair of kidney ports 19 to connect motor cylinder block 15 to the internal hydraulic porting (not shown). It will also be understood that the various gears and other components that would be used in connection with this invention if used with a transaxle are not depicted herein.

Figure 4:
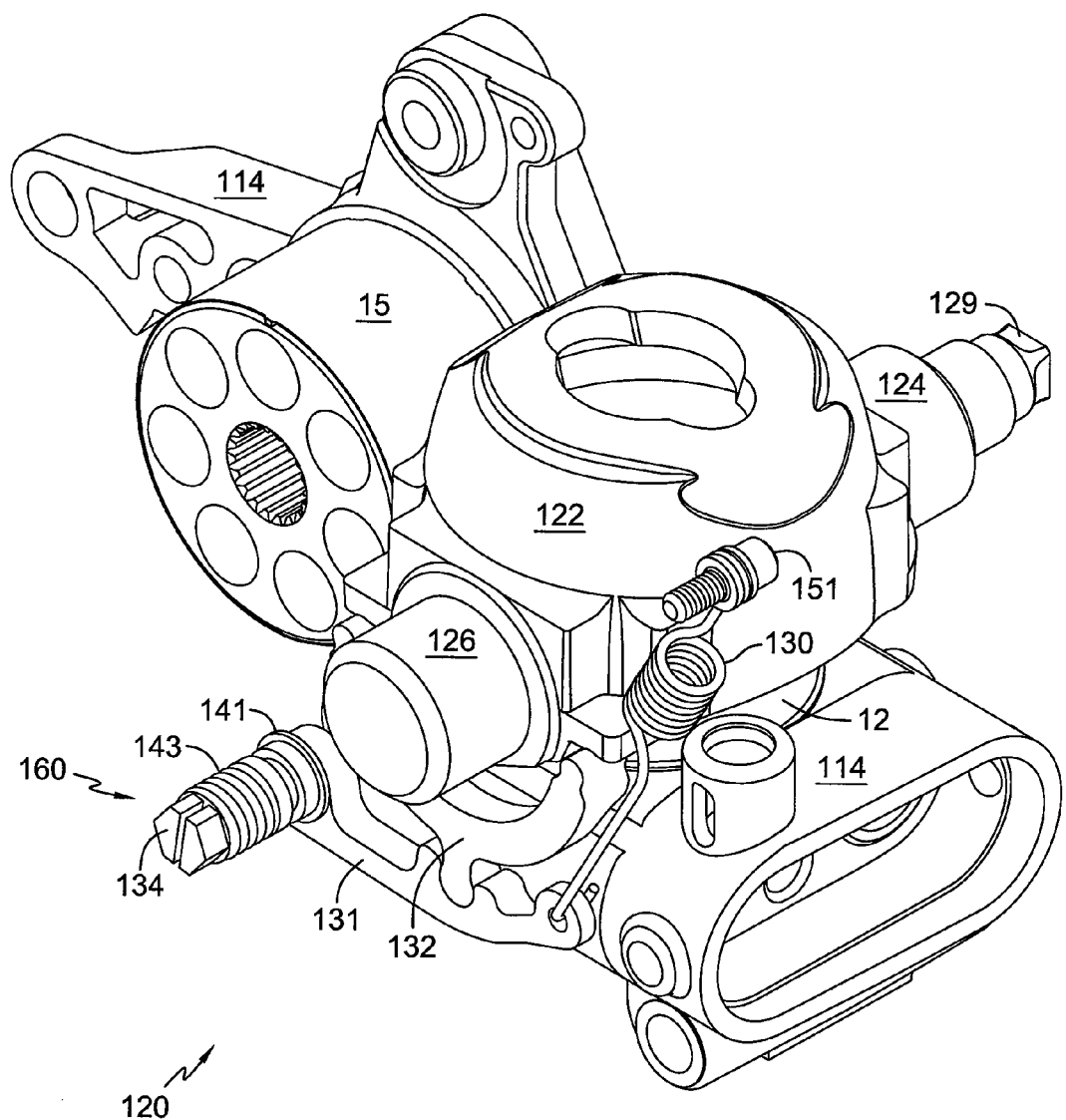
FIG. 4 is a perspective view of an exemplary hydrostatic transmission encompassing a second embodiment of this invention.
Figure 5:
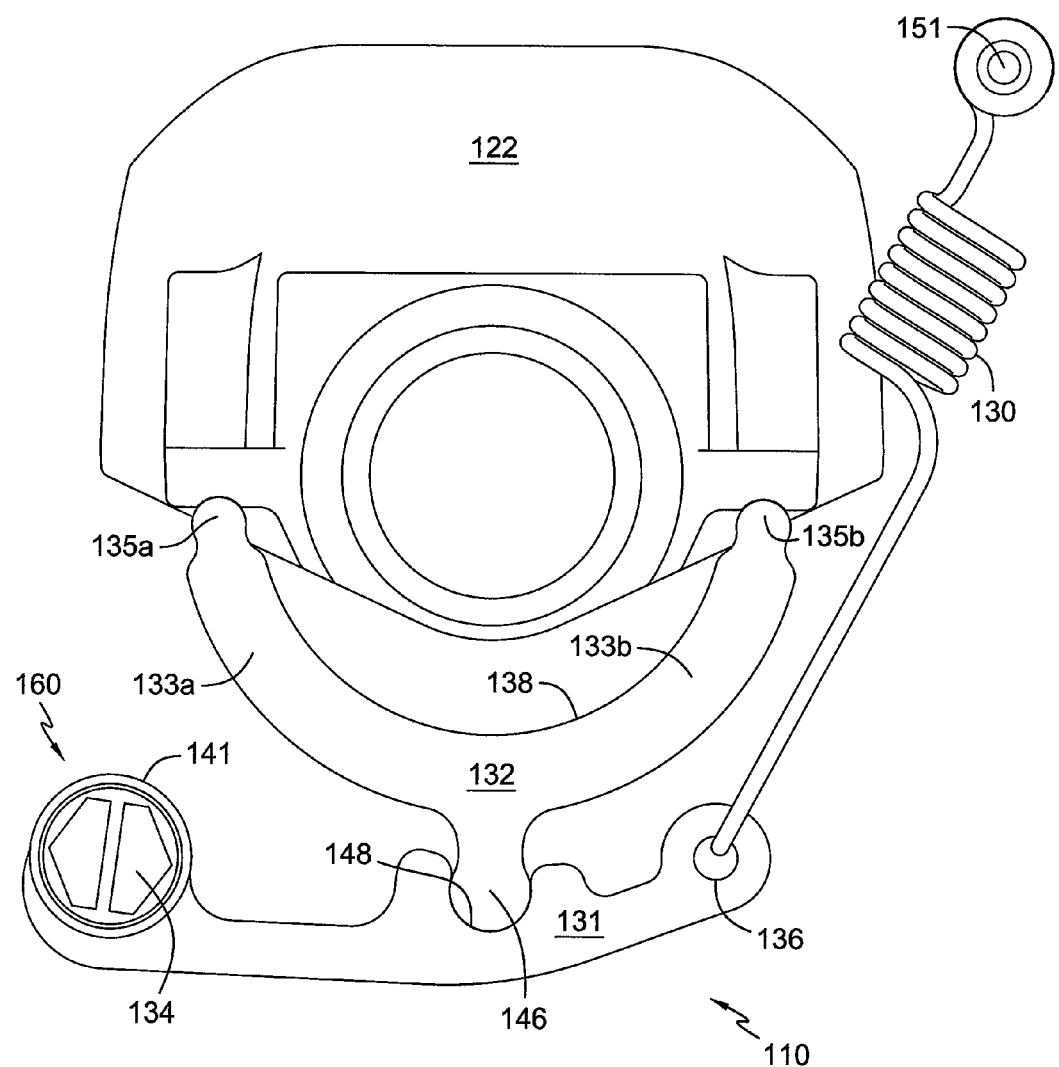
FIG. 5 is a side elevational view of a swash plate and return to neutral mechanism in accordance with the second embodiment of this invention, with the swash plate in the neutral position.
Figure 6:
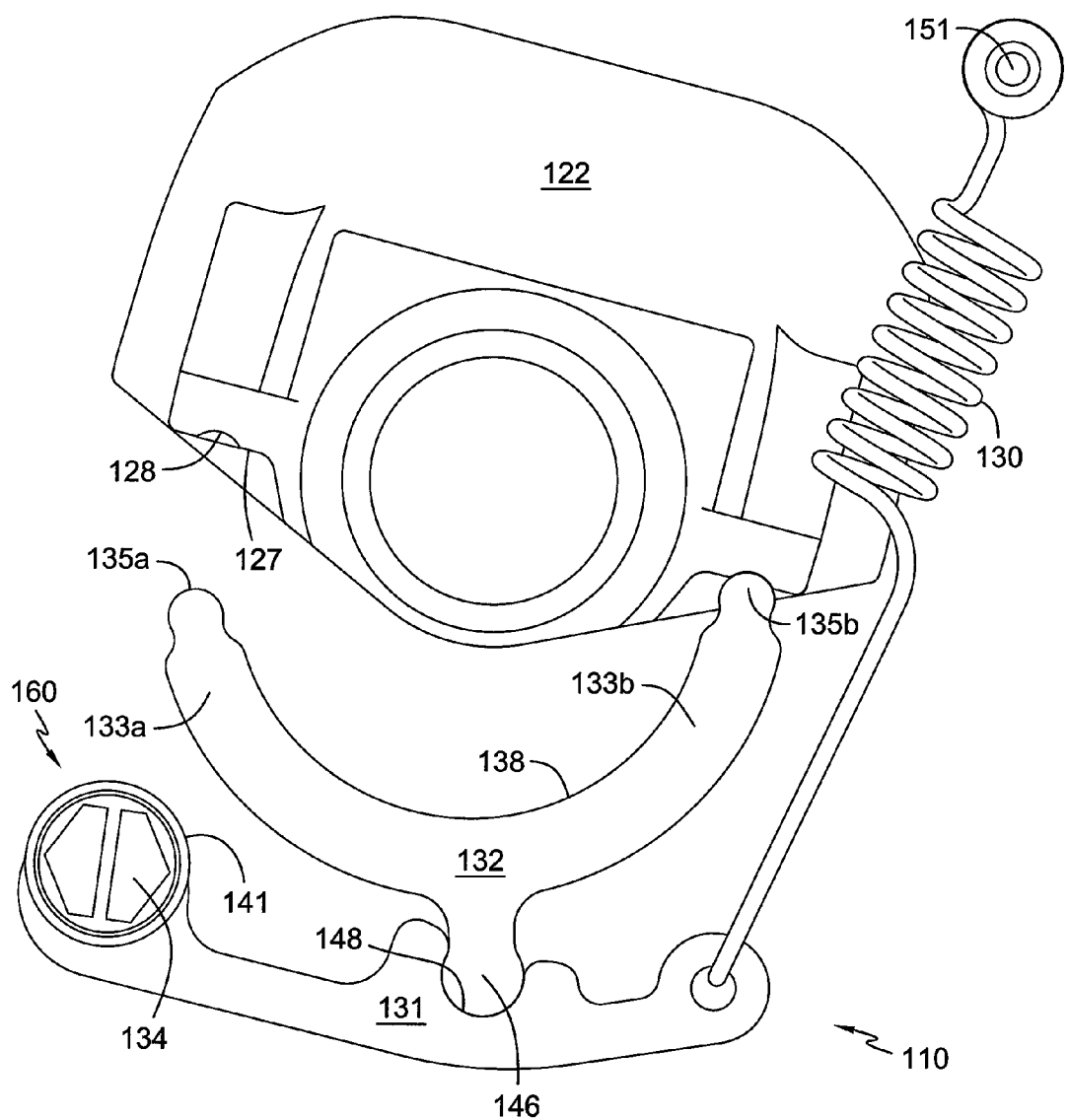
FIG. 6 is a view similar to FIG. 5, with the swash plate in a first stroked position.
Figure 7:
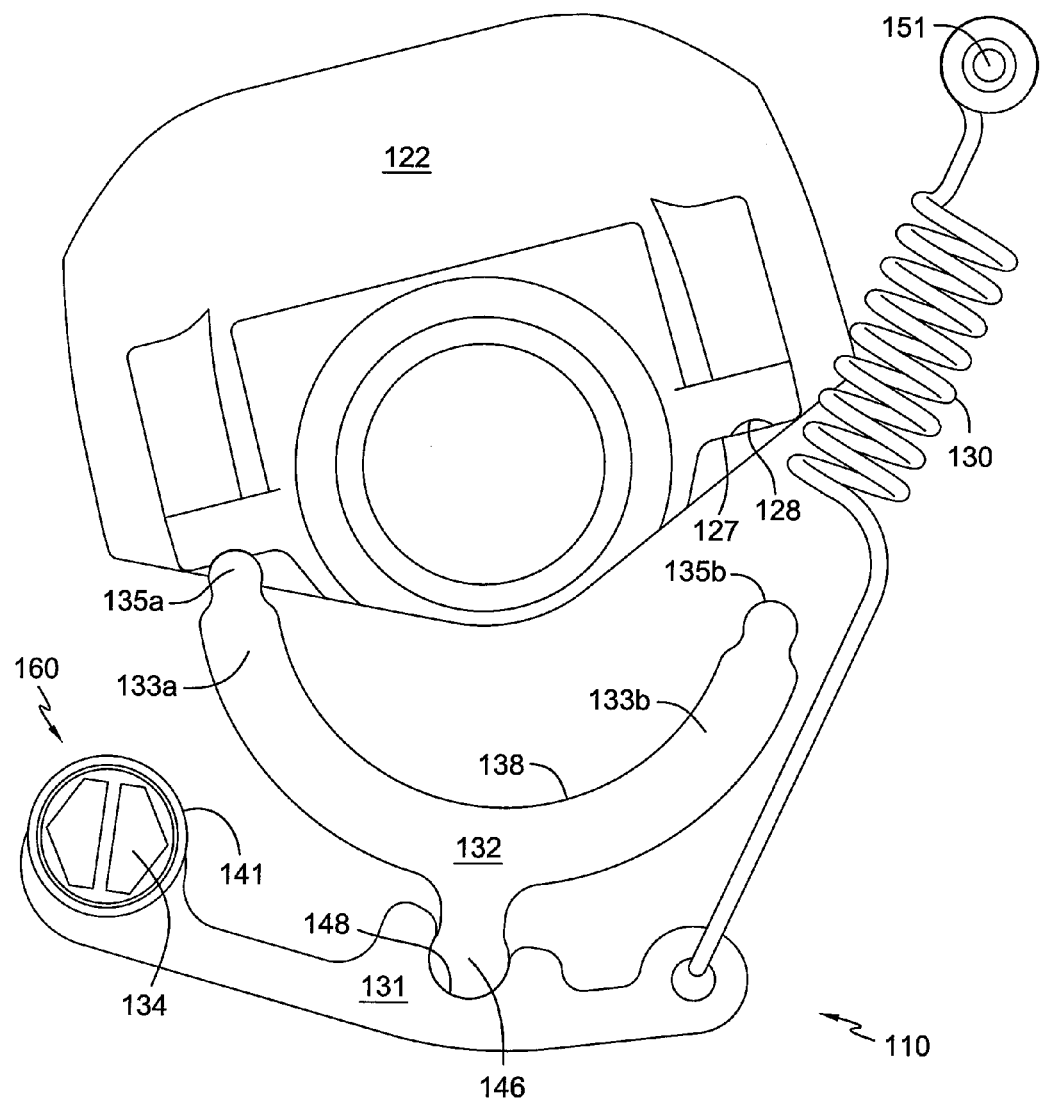
FIG. 7 is a view similar to FIGS. 5 and 6, with the swash plate in a second stroked position.

As shown in, e.g., FIG. 4, swash plate 122 is used to control the output of hydraulic pump cylinder block 12; a swash plate bearing (not shown) located inside swash plate 122 engages with pump pistons (not shown). In neutral, swash plate 122 is generally perpendicular to the rotational axis of pump cylinder block 12.

Trunnion 124 extends from one side of swash plate 122 and includes a portion 129 engaged to a control mechanism (not shown) located external to housing 150 for causing rotation of swash plate 122. Trunnion 124 extends from the side of swash plate 122 opposite to the side where the return to neutral mechanism 110 is located. A second support trunnion 126 can be used to support swash plate 122 within housing 150 and would be located on the same side of swash plate 122 as return to neutral mechanism 110.

A similar arrangement can be used with the other embodiments depicted herein; for example, swash plate 22 in FIGS. 1-3 can use two support trunnions 24, 26 that are similar in function to that previously described. It will be understood that return to neutral mechanism 10 or 110 could be on the same side as the trunnion 24 or 124, depending on factors such as housing size and the like. It will also be understood that other methods of supporting a swash plate, such as a cradle bearing, are known and are interchangeable with the use of a pair of opposing trunnions.

In a first embodiment, return to neutral mechanism 10 comprises yoke 32 engaged to load arm 31 and swash plate 22. At one end of load arm 31, spring 30 is secured to spring attachment opening 36 and to a fixed point in the housing (not depicted in this embodiment), thus providing the return force to load arm 31 and yoke 32. In operation load arm 31 pivots about adjustment mechanism 60, and in particular about the axis of protrusion 49, described in more detail below. Yoke 32 comprises a pair of arms 33a and 33b joined by a curved surface, culminating in a preferably curved end 35a and 35b, respectively. Yoke 32 is secured to a side of load arm 31 in a manner to permit its rotation with respect thereto.

As shown most clearly in FIG. 2, swash plate 22 includes an end portion 25, which may be integrally formed therewith, and having a generally curved shape culminating in two stops 27, which are connected by curved interface 23. Interface 23 preferably has a radius complementary to that of curved surface 38 on yoke 32. It will be understood that these two surfaces will not actually contact one another when the unit is in neutral, as shown in FIG. 3, but that there would be a small gap between them, and the contact between yoke 32 and swash plate 22 will be through arms 33a, 33b contacting the two stops 27 when the unit is in neutral. The geometry of these components, such as yoke 32, load arm 31, location of spring attachment opening 36, and the like can be modified to change the restoring moment of yoke 32 as a function of the swash angle, depending on the specific application requirements.

The location of the neutral position for swash plate 22 may be adjusted by the externally accessible adjustment mechanism 60, which is similar in operation to the adjustment mechanism 160 discussed in detail below in connection with the second embodiment of this invention. In general, adjustment mechanism 60 extends through the housing (not shown in this embodiment) so that shoulder 41 engages an internal surface of the housing and threaded portion 43 and adjustment hex 34 are located outside the housing. An off-center protrusion 49 is located on the internal end of adjustment mechanism 60 and is mounted in opening 39 formed in one end of load arm 31. Since protrusion 49 is off-center with respect to the axis of rotation of adjustment 60, the position of load arm 31 changes as adjustment mechanism 60 is rotated.

The return to neutral mechanism 10 is bidirectional. One of the arms of yoke 32 can be easily shortened so that only one of the stops 27 is contacted by yoke 32, in the event one wishes to provide for a unidirectional return to neutral; i.e., providing a return force only when the swash plate is stroked in one direction but not the other. Such a feature is described below in connection with further embodiments.

A second embodiment of this invention showing a bidirectional return to neutral mechanism 110 is depicted in FIGS. 4-12. The relationship of the return to neutral mechanism 110 and housing 150 can best be understood in connection with the second embodiment of the invention as depicted in, e.g., FIGS. 8 and 9. This same connection to the housing could be used in connection with the first embodiment of return to neutral mechanism 10, but the housing is not depicted in FIGS. 1-3 for clarity. It will be understood that many of the same components as described above may be used and similar reference numerals are used for components that may be identical to those previously discussed. For example, the shape of center section 114 is not critical to this invention and different center sections could be used or, as noted above, the invention could be used in a design that does not use a center section.

Figure 8:
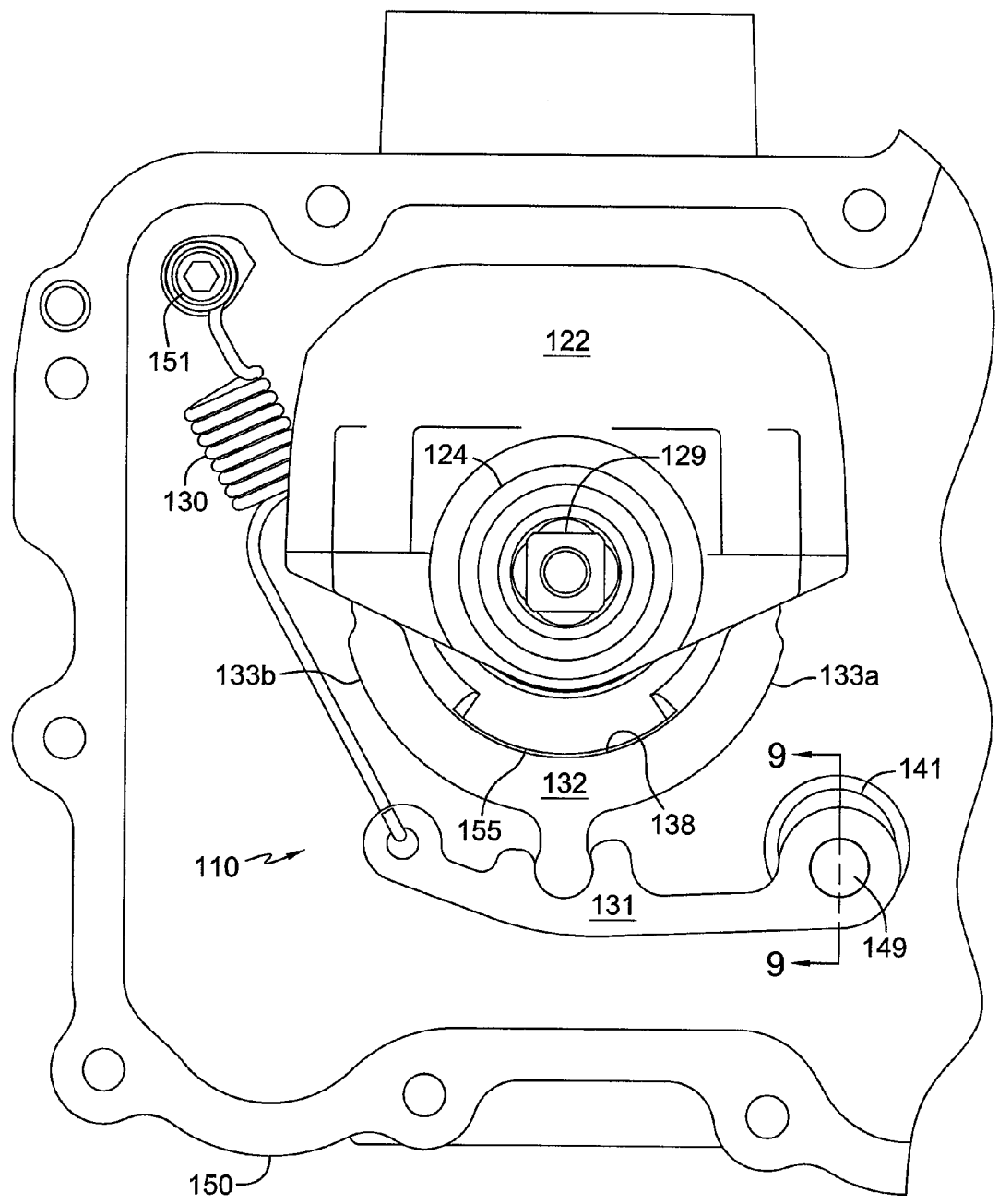
FIG. 8 is an opposite side elevational view of the swash plate and return to neutral mechanism as shown in FIG. 5, and depicting a portion of the housing.

In this second embodiment, return to neutral mechanism 110 comprises load arm 131, which is sandwiched between housing 150 and center section 114. Load arm 131 may also be retained in place by other methods, such as a retaining ring on adjustment mechanism 160. At one end of load arm 131, spring 130 is secured to spring attachment hole 136 and to a fixed point, which may be a fastener 151 attached to housing 150, as shown in FIG. 8, thus providing the return force to load arm 131 and yoke 132. The other end of load arm is supported in housing 150 by adjustment mechanism 160, described below. In operation load arm 131 pivots about adjustment mechanism 160, and in particular about the axis of protrusion 149.

Figure 9:
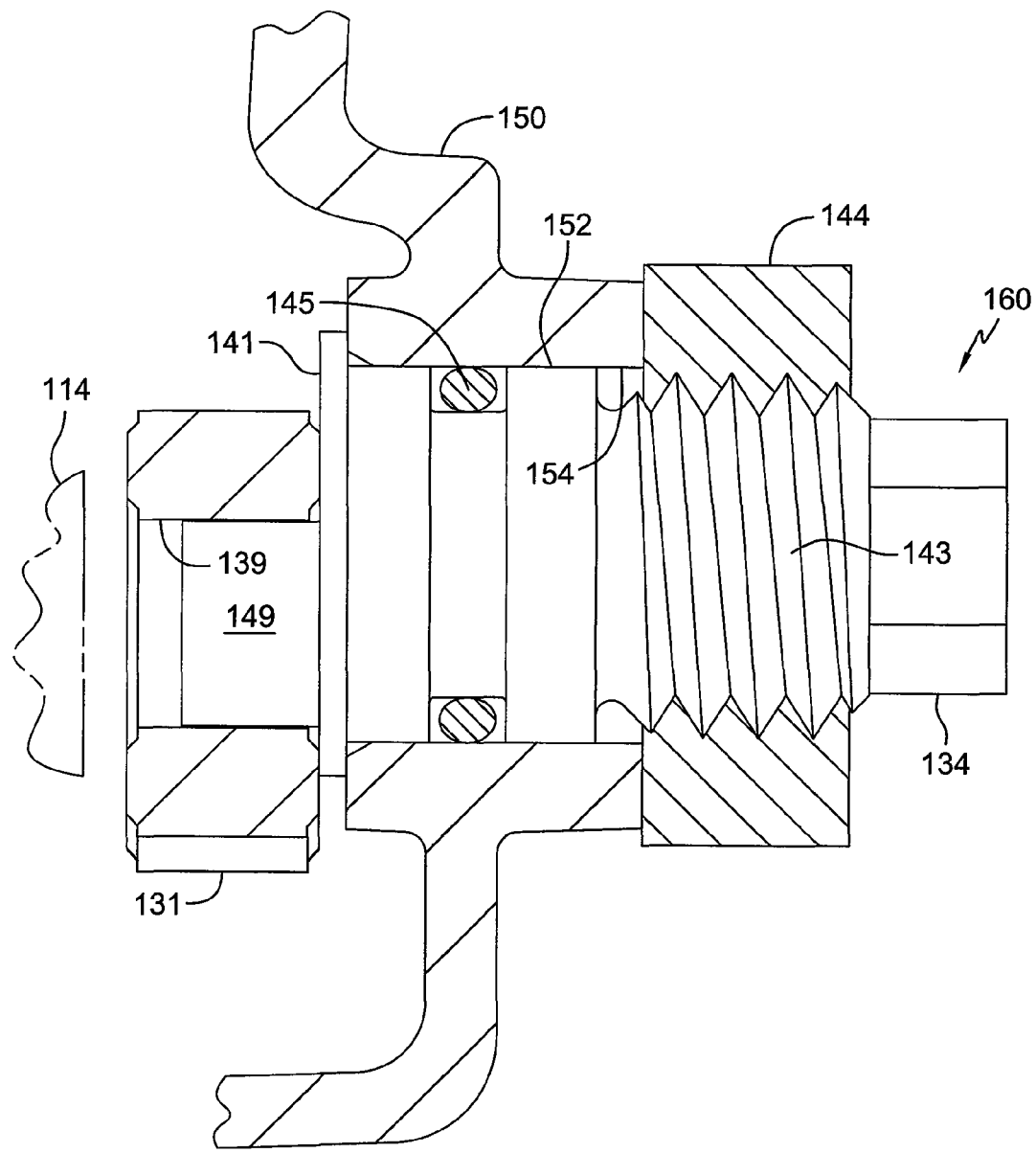
FIG. 9 is a partially cross-sectional side view of a portion of the housing and the return to neutral mechanism along the lines 9-9 as shown in FIG. 8, where the adjustment mechanism is not cross-sectioned for clarity.
Figure 10:
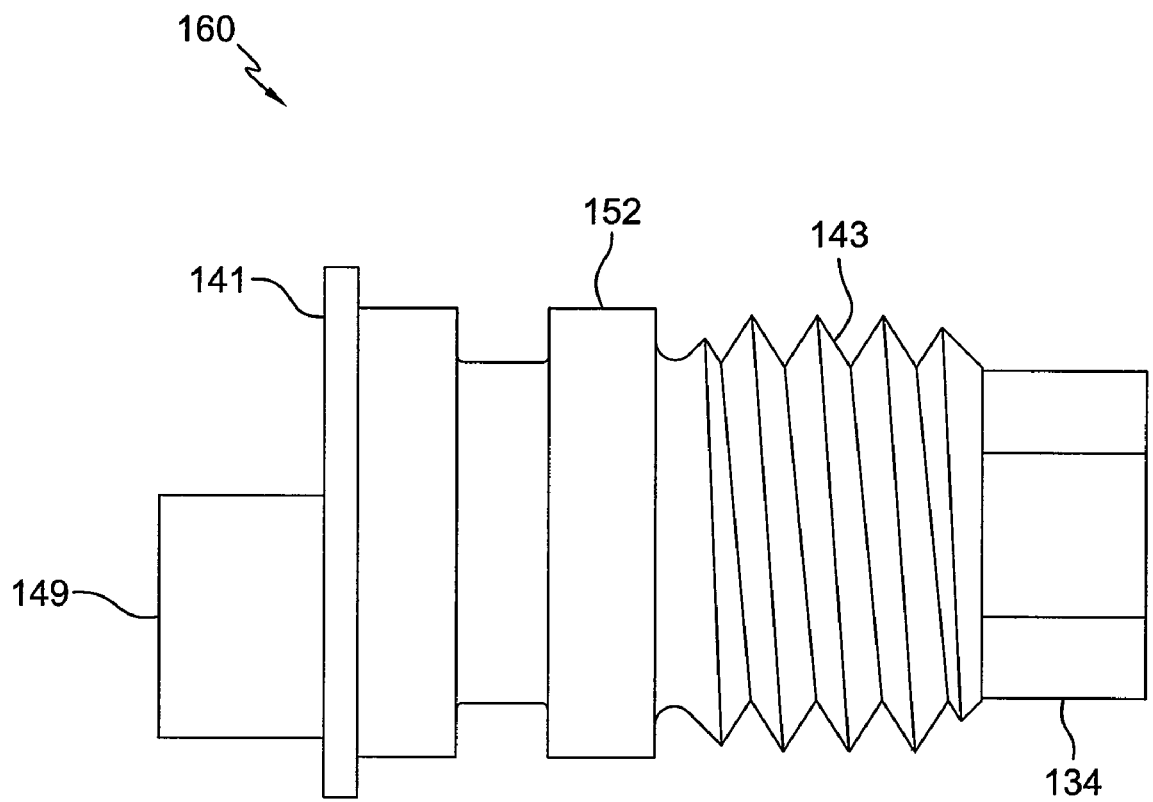
FIG. 10 is a plan view of the adjustment mechanism shown in FIG. 9.
Figure 11:
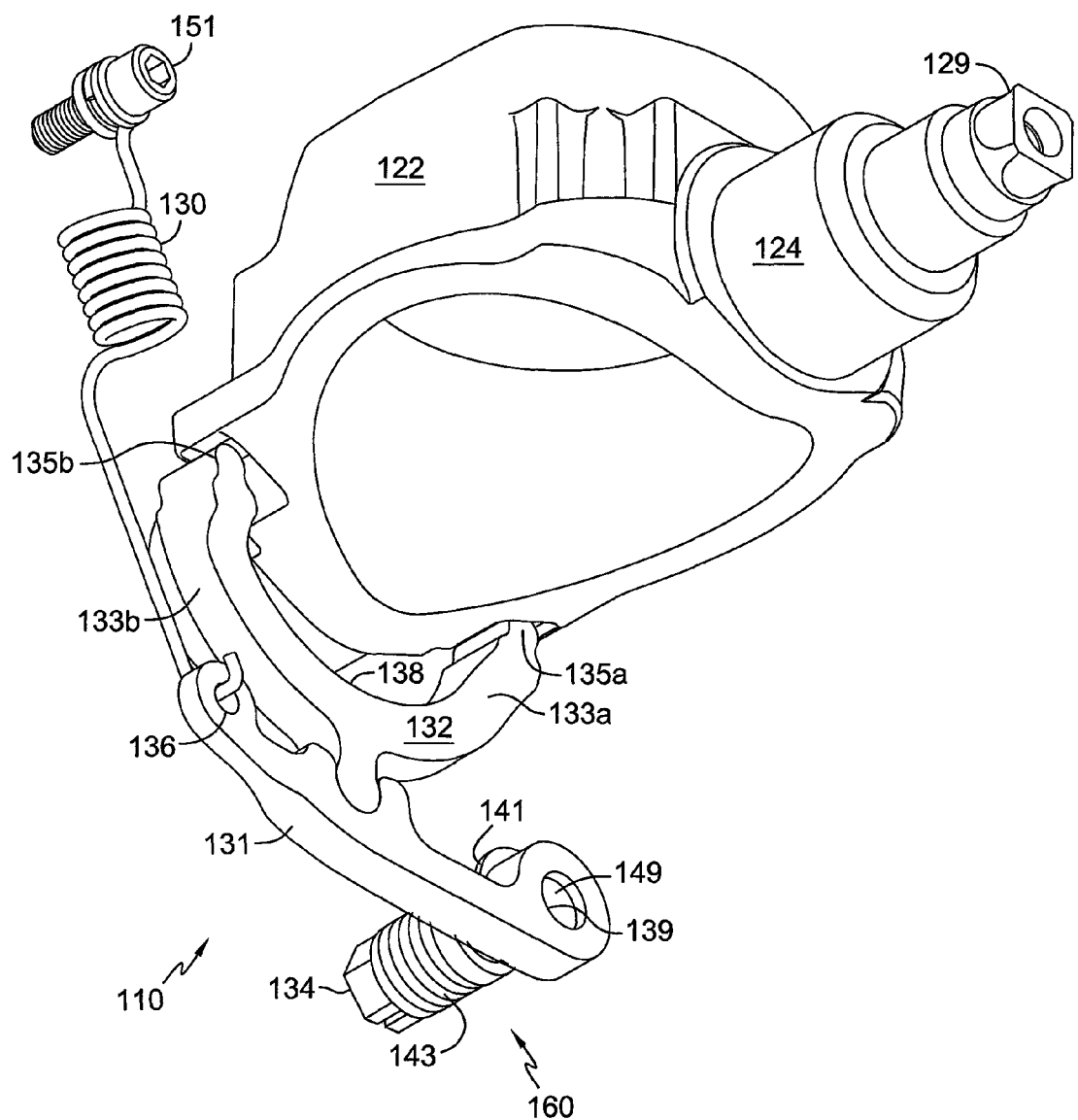
FIG. 11 is a perspective view of the second embodiment of this invention, depicting the return to neutral structure and exemplary swash plate, showing the relationship of the two when the swash plate is in a neutral position.
Figure 12:
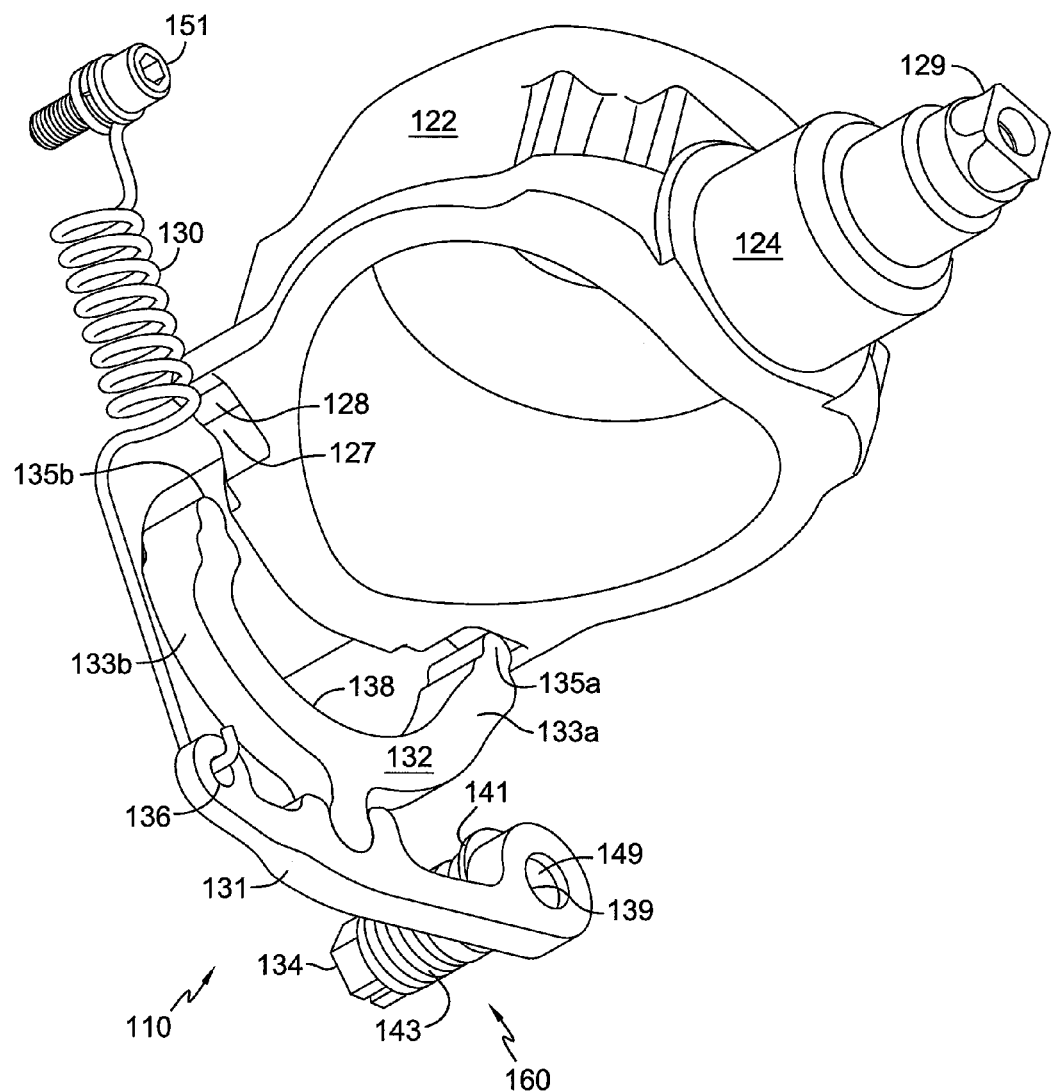
FIG. 12 is a perspective view similar to FIG. 11, showing the swash plate in a stroked position.

The location of the neutral position for swash plate 122 may be adjusted by modifying the set position of load arm 131; this is accomplished by means of the externally accessible adjustment mechanism 160, seen most clearly in FIGS. 9 and 10. In FIG. 9 certain components such as housing 150 are sectioned, but adjustment mechanism 160 is not sectioned merely for clarity. Adjustment mechanism 160 comprises bearing surface 152 extending through an opening 154 in housing 150 so that shoulder 141 engages an internal surface of housing 150. An off-center protrusion 149 is located on one end of adjustment mechanism 160 internal to housing 150; protrusion 149 is mounted in opening 139 formed in one end of load arm 131. A threaded portion 143 and adjustment hex 134 are located at the opposite end of adjustment mechanism 160 and are located outside the housing so that a user can adjust mechanism 160 externally, and then lock the unit in the selected position by means of locknut 144. Seal 145 is used to prevent leakage through opening 152. Since protrusion 149 rotates with shoulder 141 but is located off-center with respect to the axis of rotation of adjustment 160, it will move the set position of load arm 131 as adjustment mechanism 160 is rotated. While it is generally intended that the adjustment mechanisms 60 and 160 disclosed herein are used to locate neutral, it will be understood that these mechanisms could also be set to be biased to an off-neutral position, so that yoke 32 or 132 would return swash plate 22 or 122 to some preselected, non-neutral position.

Yoke 132 comprises a pair of arms 133 joined by a curved surface, each arm culminating in a preferably curved end 135. In the second embodiment, the shapes of yoke 132 and load arm 131 and the relationship between these elements and with swash plate 122 are slightly different than the first embodiment. Yoke 132 includes two arms 133a, 133b extending from the main body thereof to engage swash plate 122 and, in particular pockets 128 formed in surfaces 127. Pockets 128 act as the stops and are shaped to receive curved ends 135a, 135b of each arm 133a, 133b; using a curved interaction surface such as pocket 128 as the stop improves the interaction between yoke 132 and swash plate 122, thereby narrowing the dead band.

Housing interface 155 shown in FIG. 8 may be formed on an internal surface of housing 150 and permits the use of a smaller swash plate than the embodiment shown in, e.g., FIGS. 2 and 3. In the bidirectional embodiment depicted in, e.g., FIG. 8, there will be a clearance between housing interface 155 and curved portion 138 of yoke 132. Housing interface 155 is not depicted in FIGS. 5-7 in order to more clearly show the geometry of the other elements.

Yoke 132 is secured to load aim 131 by means of a protuberance 146 shaped to engage a pocket 148 on load arm 131; this arrangement is generally less expensive to manufacture than the structure shown in the first embodiment and also maintains the forces between yoke 132 and load arm 131 in the same plane.

Figure 13:
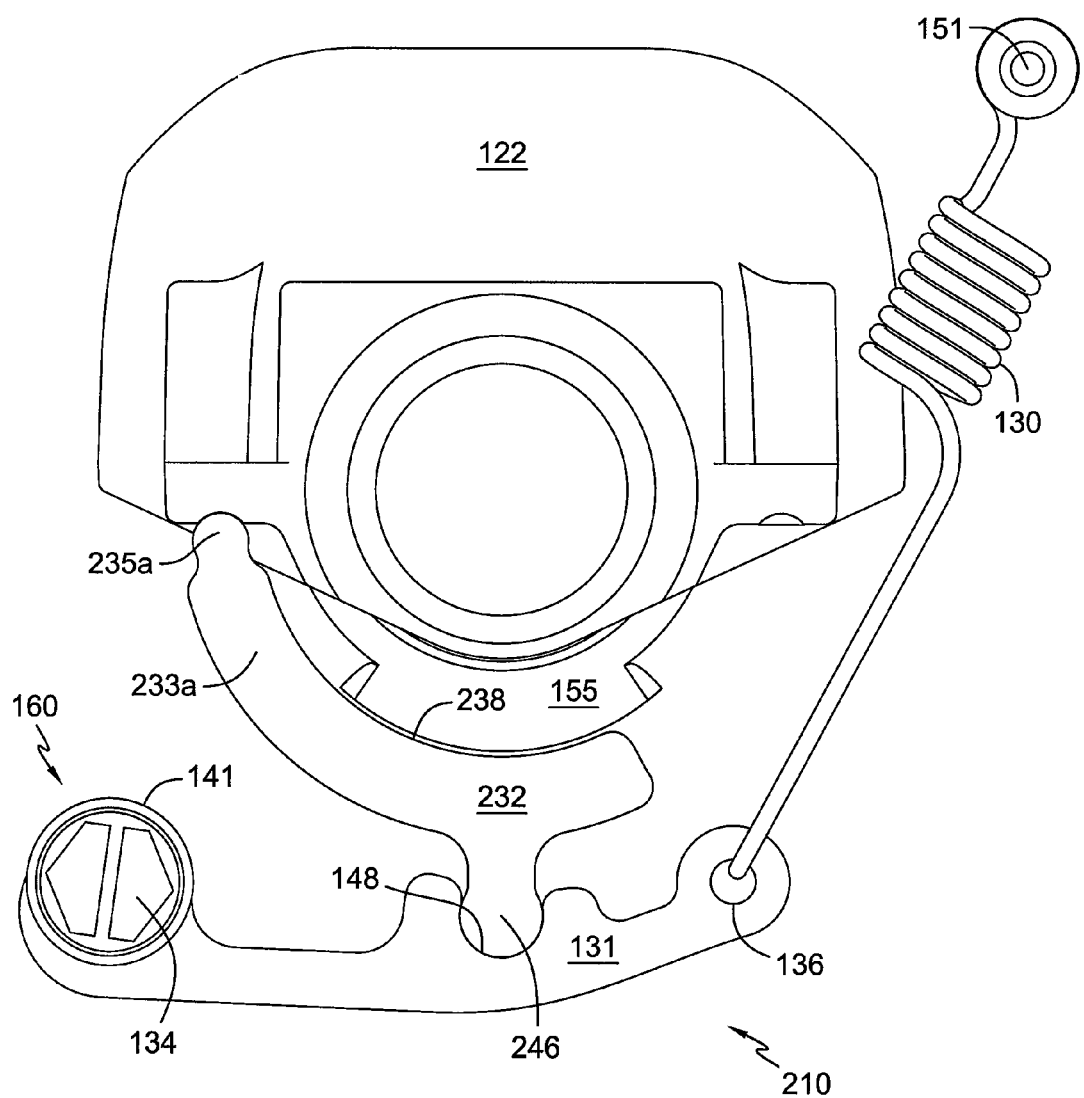
FIG. 13 is a side elevational view of a third embodiment of this invention, depicting the swash plate in the neutral position.
Figure 14:
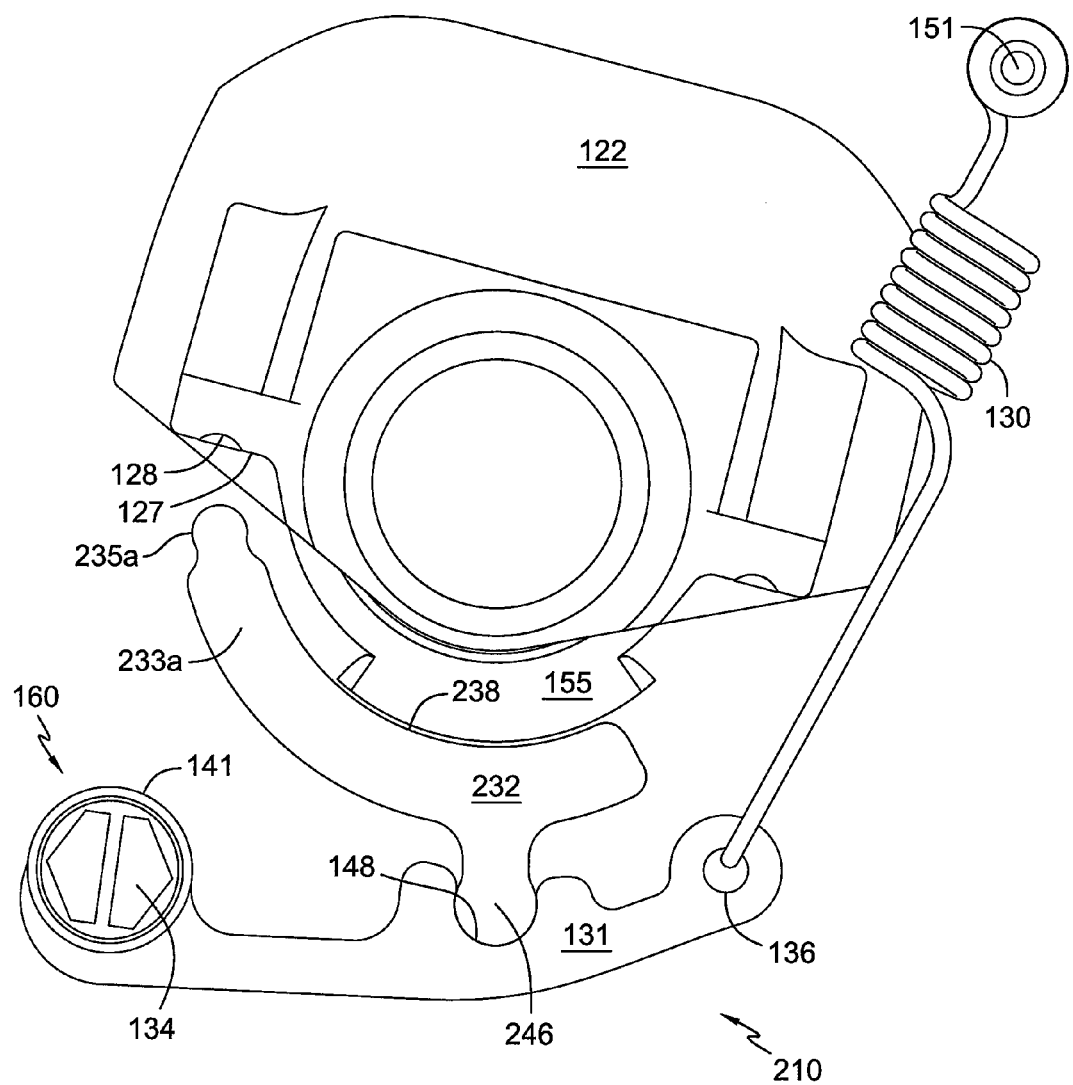
FIG. 14 is a view similar to FIG. 13, with the swash plate in a first stroked position.
Figure 15:
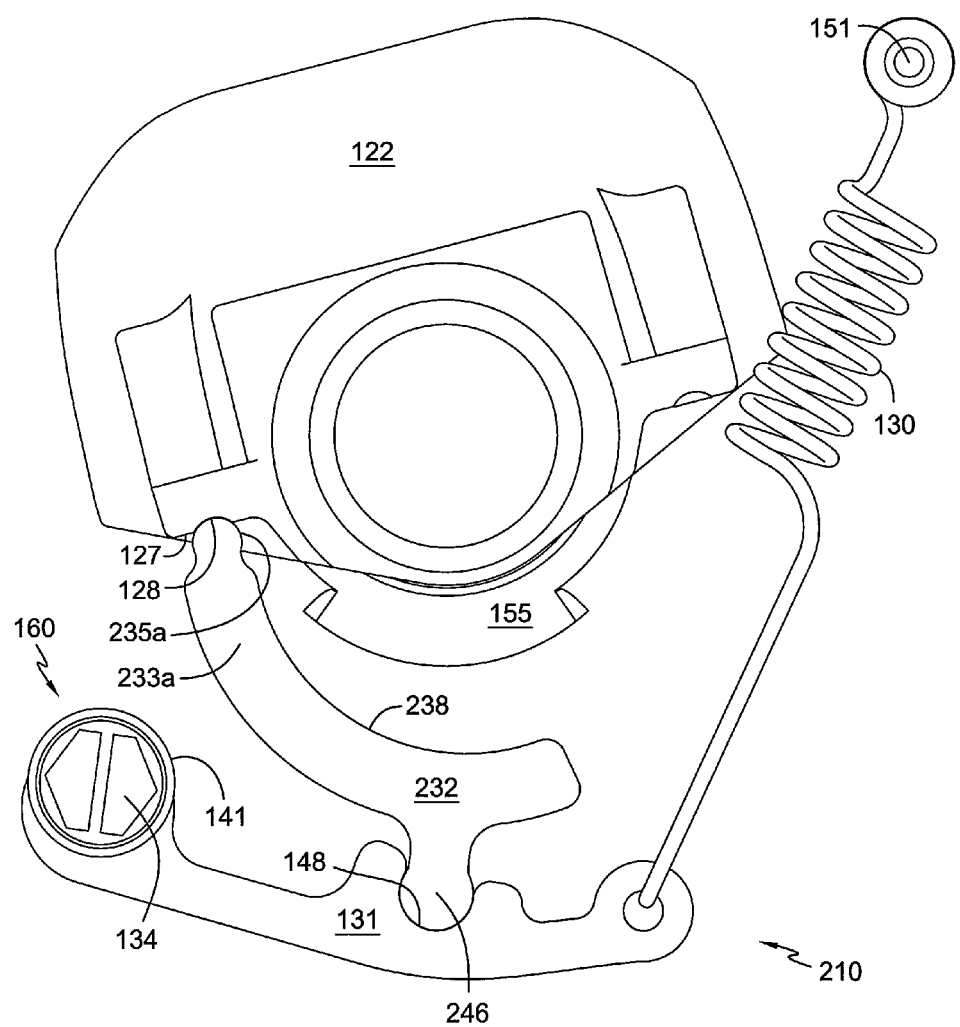
FIG. 15 is a view similar to FIGS. 13 and 14, with the swash plate in a second stroked position.

A further embodiment is depicted in FIGS. 13-15, which show a unidirectional return to neutral mechanism 210, which is similar in many ways to mechanism 110 previously discussed. Many of the same components may be used and similar reference numerals are used for components that may be identical to those previously discussed. For example, load arm 131 and its mounting within the housing can be same as previously described.

In this embodiment, yoke 232 includes protuberance 246 mounted into pocket 148 on load arm 131. Yoke 232 includes, however, only one arm 233a, with the other arm removed. Thus, when swash plate 122 is stroked in the direction shown in FIG. 15, a return force is provided by the interaction of arm 233a with swash plate 122, and more particularly with the interaction of curved end 235a with pocket or stop 128 formed in swash plate surface 127. In this unidirectional embodiment as opposed to the prior bidirectional embodiment, curved portion 238 of yoke 232 interacts with housing interface 155 so that there is no clearance between these two elements.

When swash plate 122 is stroked in the first direction such as is depicted in FIG. 14, there is no contact between swash plate 122 and yoke 232, so that no return force is provided in this direction. Note that the same swash plate 122 as previously described is used in this embodiment, to minimize the number of components needed for different applications. If desired, one could use a different swash plate having only the one stop 128 needed. Similarly, the same housing as in the prior embodiments could be used. As shown in FIGS. 13-15, a housing interface 155 may be used in this unidirectional embodiment It is to be understood that the above description of the invention should not be used to limit the invention, as other embodiments and uses of the various features of this invention will be obvious to one skilled in the art. This invention should be read as limited by the scope of its claims only.

I claim:

1. A return to neutral mechanism for use with a movable swash plate disposed within a housing, the mechanism comprising:
a first return member having a first end pivotally secured in the housing, and a second end, whereby the first return member is permitted to rotate about a first axis adjacent the first end;
a bias member secured to the second end of the first return member to provide a bias force to the first return member;
a second return member engaged to the first return member at a point between the first and second ends of the first return member to be rotatable about a second axis adjacent the point and parallel to the first axis, the second return member comprising at least a first contact arm positioned to contact a first stop on the swash plate, whereby the first contact arm provides a return force to the swash plate through the first stop when the swash plate is stroked in a first direction; and
an adjustment mechanism engaged to the first end of the first return member for adjusting the position of the first return member, wherein a portion of the adjustment mechanism extends outside the housing to permit external adjustment.

2. The return to neutral mechanism of claim 1, wherein the second return member further comprises a second contact arm positioned to contact a second stop on the swash plate, whereby the second contact arm provides a return force to the swash plate through the second stop when the swash plate is stroked in a second direction.

3. The return to neutral mechanism of claim 1, wherein the bias member comprises a spring having a first end engaged to the first return member and a second end secured to an inner surface of the housing.

4. The return to neutral mechanism of claim 1, wherein the second return member further comprises a protuberance and the first return member further comprises a pocket shaped to receive the protuberance, to permit the second return member to pivot with respect to the first return member.

5. The return to neutral mechanism of claim 1, wherein the first contact arm comprises a curved surface, and the first stop comprises a pocket shaped to receive the curved surface.

6. The return to neutral mechanism of claim 2, wherein the first and second contact arms each comprise a curved surface and the first and second stops each comprise a pocket shaped to receive the respective curved surfaces.

7. The return to neutral mechanism of claim 1, wherein the second return member is secured to a side surface of the first return member.

8. The return to neutral mechanism of claim 2, further comprising a means for adjusting the location of the first return member.

9. A hydraulic drive device, comprising:
a housing;
a rotatable cylinder block disposed in the housing and having a plurality of pistons disposed therein, and a movable swash plate engaged to the pistons for controlling the output of the cylinder block;
a first return member disposed in the housing and having a first end about which the first return member is pivotable, and a second end;
a bias member engaged to the second end of the first return member to provide a return force thereto;
a second return member pivotally engaged to the first return member between the first and second ends of the first return member, the second return member comprising at least a first contact arm positioned to contact a first stop on the swash plate, whereby the first contact arm provides a return force to the swash plate when the swash plate is stroked in a first direction; and
an adjustment mechanism engaged to the first end of the first return member for adjusting the position of the first return member, wherein a portion of the adjustment mechanism extends outside the housing to permit external adjustment.

10. The hydraulic drive device of claim 9, wherein the swash plate further comprises a first trunnion on a first side thereof and a second trunnion on a second side thereon, and the second trunnion is adapted to receive a control mechanism.

11. The hydraulic drive device of claim 9, wherein the rotatable cylinder block comprises a hydraulic pump rotatably disposed on a center section, and further comprising a hydraulic motor rotatably disposed on the center section.

12. The hydraulic drive device of claim 9, wherein the bias member comprises a spring having a first end engaged to the first return member and a second end secured to an inner surface of the housing.

13. The hydraulic drive device of claim 9, wherein the second return member further comprises a protuberance and the first return member further comprises a pocket shaped to receive the protuberance, to permit the second return member to pivot with respect to the first return member.

14. The hydraulic drive device of claim 9, wherein the second return member further comprises a second contact arm positioned to contact a second stop on the swash plate, whereby the second contact arm provides a return force to the swash plate through the second stop when the swash plate is stroked in a second direction.

15. The hydraulic drive device of claim 14, wherein the first and second contact arms each comprise a curved surface, and the first and second stops each comprise a pocket shaped to receive the respective curved surface.

16. A return to neutral mechanism for use with a movable swash plate disposed within a housing, the return to neutral mechanism comprising:
a return assembly for providing a return force to the swash plate when the swash plate is stroked in at least a first direction, the return assembly comprising a first return member disposed in the housing and permitted to rotate about a first end of the first return member; and
an adjustment mechanism for adjusting the position of the first return member, the adjustment mechanism comprising:
a rotatable bearing member extending through an opening in the housing so that a first end of the rotatable bearing member is accessible outside the housing;
a shoulder disposed at a second end of the rotatable bearing member and inside the housing, wherein rotation of the rotatable bearing member causes the shoulder to rotate; and
an off-center protrusion disposed on the shoulder and engaged to the first return member, whereby the first return member rotates about the off-center protrusion thereby adjusting the position of the first return member with respect to the swash plate.

17. The return to neutral mechanism of claim 16, further comprising:
a bias member secured to the second end of the first return member to provide a bias force to the first return member; and
a second return member engaged to the first return member at a point between the first and second ends of the first return member, the second return member comprising at least a first contact arm positioned to contact a first stop on the swash plate, whereby the first contact arm provides the return force to the swash plate when the swash plate is stroked in a first direction.

18. The return to neutral mechanism of claim 17, wherein the second return member further comprises a second contact arm positioned to contact a second stop on the swash plate, whereby the second contact arm provides a return force to the swash plate through the second stop when the swash plate is stroked in a second direction.

19. A return to neutral mechanism for use with a movable swash plate disposed within a housing, the mechanism comprising:
a first return member having a first end pivotally secured in the housing, and a second end, whereby the first return member is permitted to rotate about the first end;
a bias member secured to the second end of the first return member to provide a force to the first return member; and
a second return member engaged to the first return member at a point between the first and second ends of the first return member, the second return member comprising a single contact arm positioned to contact a stop on the swash plate, whereby the second return member provides a return force to the swash plate through the stop when the swash plate is stroked in a first direction, and the second return member does not provide any return force to the swash plate when the swash plate is stroked in a second direction.

20. The return to neutral mechanism of claim 19, wherein the contact arm comprises a curved surface and the stop comprises a pocket shaped to receive the curved surface.

21. The return to neutral mechanism of claim 19, further comprising an adjustment mechanism engaged to the first end of the first return member for adjusting the position of the first return member.

22. A return to neutral mechanism for use with a movable swash plate disposed within a housing, the mechanism comprising:
   a first return member having a first end pivotally secured in the housing, and a second end, whereby the first return member is permitted to rotate about a first axis adjacent the first end;
   a bias member secured to the second end of the first return member to provide a bias force to the first return member;
   a second return member engaged to the first return member at a point between the first and second ends of the first return member to be rotatable about a second axis adjacent the point and parallel to the first axis, the second return member comprising at least a first contact arm positioned to contact a first stop on the swash plate, whereby the first contact arm provides a return force to the swash plate through the first stop when the swash plate is stroked in a first direction; and
   the second return member further comprising a protuberance and the first return member further comprising a pocket shaped to receive the protuberance, to permit the second return member to pivot with respect to the first return member.

23. A return to neutral mechanism for use with a movable swash plate disposed within a housing, the mechanism comprising:
   a first return member having a first end pivotally secured in the housing, and a second end, whereby the first return member is permitted to rotate about a first axis adjacent the first end;
   a bias member secured to the second end of the first return member to provide a bias force to the first return member; and
   a second return member engaged to the first return member at a point between the first and second ends of the first return member to be rotatable about a second axis adjacent the point and parallel to the first axis, the second return member comprising at least a first contact arm positioned to contact a first stop on the swash plate, the first contact arm comprising a curved surface, and the first stop comprising a pocket shaped to receive the curved surface, and the first contact arm provides a return force to the swash plate through the first stop when the swash plate is stroked in a first direction.

24. The return to neutral mechanism of claim 23, wherein the second return member further comprises a second contact arm positioned to contact a second stop on the swash plate, the second contact arm comprising a second curved surface and the second stop comprising a second pocket shaped to receive the second curved surface, and the second contact arm provides a return force to the swash plate through the second stop when the swash plate is stroked in a second direction.

25. A return to neutral mechanism for use with a movable swash plate disposed within a housing, the mechanism comprising:
   a first return member having a first end pivotally secured in the housing, and a second end, whereby the first return member is permitted to rotate about a first axis adjacent the first end;
   a bias member secured to the second end of the first return member to provide a bias force to the first return member; and
   a second return member secured to a side surface of the first return member, the second return member comprising at least a first contact arm positioned to contact a first stop on the swash plate, whereby the first contact arm provides a return force to the swash plate through the first stop when the swash plate is stroked in a first direction.

* * * * *